United States Patent [19]

Zahid

[11] 4,178,965

[45] Dec. 18, 1979

[54] PULSATION DAMPENER DEVICE

[75] Inventor: Abduz Zahid, Los Angeles, Calif.

[73] Assignee: Greer Hydraulics, Inc., Chatsworth, Calif.

[21] Appl. No.: 966,518

[22] Filed: Dec. 4, 1978

[51] Int. Cl.² .............................................. F16L 55/00
[52] U.S. Cl. ............................................ 138/30; 138/26
[58] Field of Search ........................... 138/26, 30, 31; 220/85 B

[56] References Cited

U.S. PATENT DOCUMENTS

| | | | |
|---|---|---|---|
| 2,548,472 | 4/1951 | Gibson | 138/26 X |
| 2,738,809 | 3/1956 | Mercier | 138/30 |
| 3,157,202 | 11/1964 | Sadler et al. | 138/26 |
| 3,868,972 | 3/1975 | Zirps | 138/30 |

Primary Examiner—Richard E. Aegerter
Assistant Examiner—James E. Bryant, III
Attorney, Agent, or Firm—Arthur B. Colvin

[57] ABSTRACT

The present invention relates to a pulsation dampener device comprising a pressure vessel having a flow through conduit secured thereto adjacent the oil port, the device being characterized by a sleeve member shiftable axially of the pressure vessel, the sleeve having a bladder secured thereto and providing a guide controlling the movements of the bladder.

5 Claims, 3 Drawing Figures

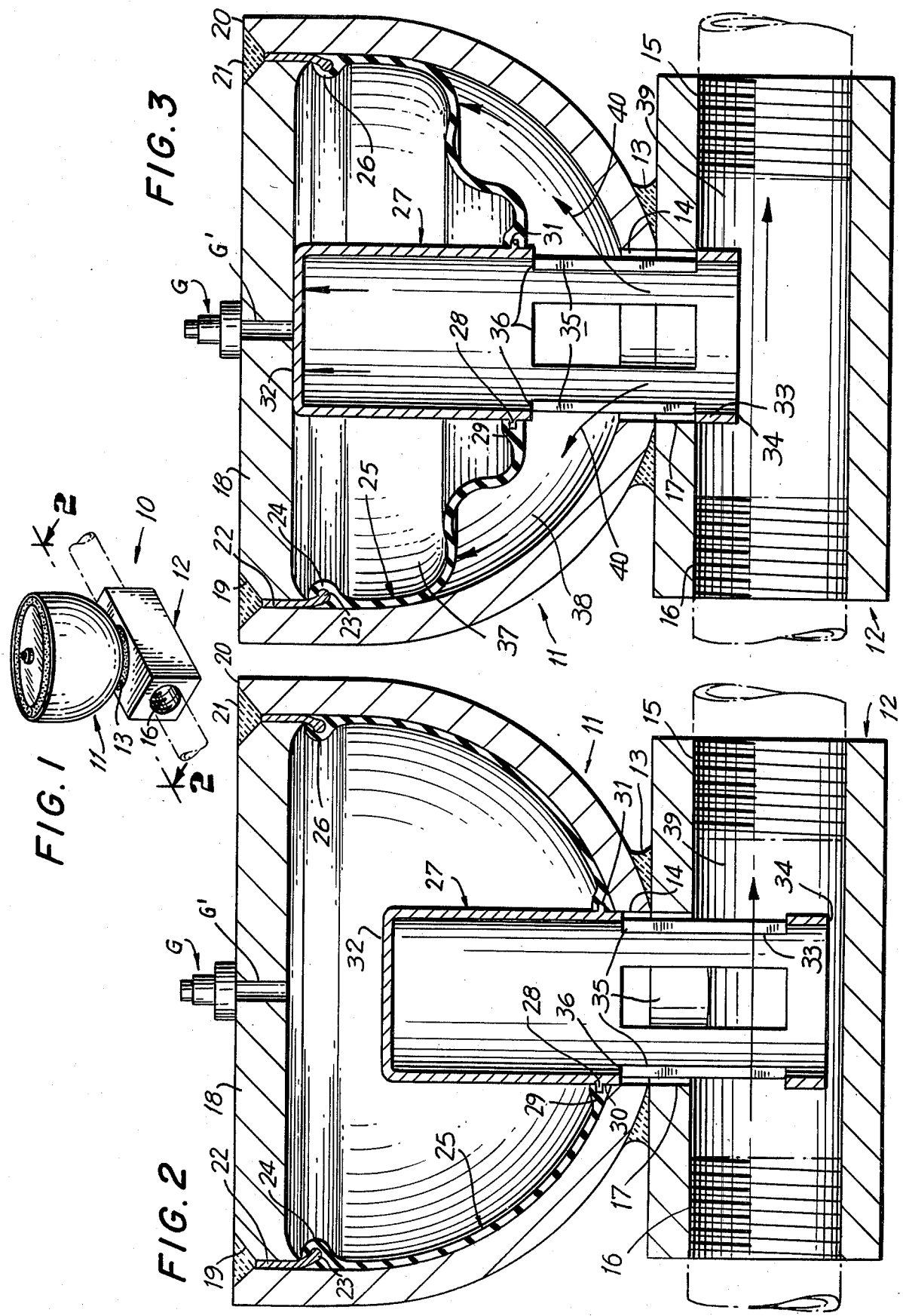

PULSATION DAMPENER DEVICE

BACKGROUND OF THE INVENTION

1. Field of the Invention

The present invention is in the field of pulsation dampeners and is more particularly in the field of dampener devices adapted to reduce the amplitude of pulsations generated by multi-piston pumps or the like.

2. The Prior Art

It is known to interpose in a hydraulic system a pulsation dampener which functions to reduce the amplitude of pulses by storing energy when a pulse of high amplitude is encountered and releasing energy when the pressure in the hydraulic system falls to a lower amplitude.

A typical pulsation dampener device may include a pressure vessel divided into two chambers by a bladder, one chamber being filled with gas under high pressure, the other chamber being connected to a conduit carrying the hydraulic fluid medium.

The bladder may typically include a valve member, such as a rigid button which seats on the oil port when the pressures within the gas chamber exceed those in the fluid conduit to prevent the bladder from extruding through the oil port. When the pressures in the liquid exceed the pressures in the gas chamber, the valve member is unseated and the liquid flows into the oil chamber bounded by the bladder.

Energy derived from unseating the valve and further compressing the gas in the gas chamber is thereafter released when the pressures in the liquid conduit fall to a level below the pressure in the gas chamber.

The constant cycle of storing and distributing energy produces a dampening effect on the pulses encountered in the liquid system.

In certain applications wherein positive displacement pumps are employed, whether of the vane, gear or piston type, and particularly of the type employing a high number of pumping elements, the displacement of liquid from each element is very small and the frequency of pulses encountered per unit of time may be very great. When such conditions are encountered, although the cumulative flow of all pumping elements may be high, the displacement of liquid from each element is small. Accordingly, in order properly to dampen the pulses of such devices, it is desirable to provide a dampener which, although having a relatively small gas volume, provides a flow area through the liquid port sufficiently large to handle the total pump flow with minimum amounts of pressure drop across the liquid port.

In the past, pulsation dampeners using button type valves have been satisfactorily employed under such circumstances. However, in the dampening of high frequency pulsations, a button type valve apparatus results in an unpredictable seating of the valve in the port, with consequent damage to the bladder which may become entrapped between the button and the seat.

To reduce the likelihood of damage to the bladder, resort has been made to poppet type valve assemblies which provide a guiding function. However, such devices do not provide the desired high flow-through area necessary where high frequency pulses are encountered and have the further disadvantage of adding materially to the forces which must be overcome before the liquid in the conduit is communicated to the interior of the pressure vessel.

SUMMARY

The present invention may be summarized as directed to a high frequency pulsation dampener device having relatively small gas volume, with consequent reduction in overall size and weight, a high volume flow passage across the oil port, while at the same time providing an efficient guide means precluding damage of the bladder in the course of its often rapid fluctuations.

More particularly, the invention relates to a pulsation dampener including a pressure vessel affixed to a conduit, a sleeve member slidably mounted for movement axially of the pressure vessel, and a bladder dividing the vessel into two chambers. The bladder is secured to the sleeve in such manner that when the pressure in the gas chamber exceeds that in the oil chamber, the sleeve extends substantially across the conduit and a seal is defined at the oil port of the pressure vessel by a thickened rim of the bladder where it joins the sleeve. The sleeve, which is closed at its upper end, is unseated responsive to pressures in the conduit greater than those in the gas chamber.

The sleeve is provided with a plurality of axially elongated apertures, providing a large and progressively increasing flow path across the oil port as the sleeve is lifted from its lowermost or seated position.

Thus, a device in accordance with the invention provides a guide function and a high capacity flow path, assuring long bladder life and efficient dampening of high frequency pulses.

Accordingly, it is an object of the invention to provide an efficient pulsation dampener especially adapted to dampening of high frequency pulses.

A further object of the invention is the provision of a dampener of the type described which is simple and relatively inexpensive to construct and which, at the same time, provides a guiding function to prevent damage to the bladder.

Still a further object of the invention is the provision of a pulsation dampener of the type described wherein the lower extremity of the bladder is affixed to a sleeve axially movably mounted within the oil port, the sleeve being sealed at its upper end and including transverse apertures adapted to lie in the path of liquid flowing through the conduit. The apertures are sufficiently large as only minimally to impede liquid flow axially of the conduit during normal operation, the apertures functioning to span the oil port when the sleeve is unseated from its lowermost position by a pulse, whereby the apertures provide flow access to the interior of the pressure vessel across the oil port.

To attain these objects and such further objects as may appear herein or be hereinafter pointed out reference is made to the accompanying drawings, forming a part hereof, in which:

FIG. 1 is a perspective view of a pulsation dampener device in accordance with the invention;

FIG. 2 is a magnified sectional view taken on the line 2—2 of FIG. 1 disclosing the operative position of the parts when the pressure in the gas chamber exceeds the pressure in the oil chamber;

FIG. 3 is a sectional view similar to FIG. 2 showing the position of the parts where the pressure in the oil chamber exceeds that in the gas chamber.

Referring now to the drawings, there is disclosed in FIG. 1 a pulsation dampener assembly 10 including generally a pressure vessel 11 and a conduit block 12 fixed at 13 as by welding to the lower end of the pressure vessel surrounding an oil port 14. The conduit block 12 is threaded at its distal ends 15, 16, enabling the block to be interposed within a conduit carrying liquid under pressure emerging from a hydraulic pump or like apparatus.

The conduit block 12 includes a radially extending aperture 17 of size coinciding with the oil port 14, the port 14 and aperture 17 forming, in essence, a continuous cylindrical bore extending from the interior of the conduit block to the interior of the pressure vessel 11.

Illustratively, the pressure vessel 11 includes at its upper end a top plate 18 having a gas charging valve G extending through gas charging port G'. The top plate 18 may comprise a flat plate secured at its peripheral portion 19 to the top 20 of the pressure vessel. While the connection between top plate 18 and the pressure vessel is disclosed in the illustrated embodiment of the invention as a continuous weld 21, it will be readily recognized that alternative means of attachment, providing for removability of the top plate, may optionally be employed.

A metallic retainer ring 22 of generally cylindrical configuration is interposed between the outer periphery of the top plate 18 and the inner periphery of the pressure vessel adjacent the upper end 20, being held in the desired position by the weld 21, the retainer ring including an inwardly directed bead or retainer portion 23 forming the anchor point for the mouth 24 of the bladder assembly 25.

The bladder assembly 25 may include an annular shoulder 26 having a non-reentrant recess, the recess being bonded to the bead 23 of the ring 22 permanently to secure the bladder to the ring.

A cylindrical actuator sleeve assembly 27 is mounted within the aligned bore defined by the oil port 14 and the aperture 17 of the block, the sleeve being axially movably mounted within the noted bore. Preferably, the axial extent of the oil portion 14 and the aperture 17 is such as to guide sleeve 27 for axial movement within the pressure vessel, although it is possible to incorporate within the vessel additional guide means to assure an accurate axial movement of the sleeve.

The sleeve includes an annular, outwardly directed shoulder 28 forming an anchor point for a thickened bead portion 29 formed on the lowermost end of the bladder surrounding a central aperture 30 therein. The bead 29, which is recessed at 31, surrounds and is bonded to the annular shoulder 28 to effect a permanent connection between the noted parts.

The sleeve 27 is closed at its upper end by top wall portion 32. The sleeve includes a depending shank portion 33 open at its lowermost end 34. A plurality of axially elongated apertures 35 are formed in the sleeve, the uppermost terminal ends 36 of the apertures lying at a level below the uppermost terminal end of the oil port 14.

From the described construction, it will be apparent that the bladder and the upper portion of the actuator sleeve 27, that is to say, the portion of the sleeve above the shoulder 28, divide the interior of the pressure vessel into two chambers, namely, a gas chamber 37 and an oil chamber 38.

FIG. 2 depicts the position of the parts when the pressure in the gas chamber 37 exceeds the pressure in the oil chamber 38. In this condition, pressure acting on the bladder and the closed end portion of the sleeve will urge the sleeve to its lower limiting position and cause the bladder to conform to the configuration of the interior of the pressure vessel. In such position, the thickened lower attachment rim 29 of the bladder forms a tight seal with the upper end of the oil port 14, isolating the oil chamber 38 from the flow passage 39 within the conduit block 12. In such lower limiting position, the apertures 35 project into the flow path but, by virtue of their large size, do not provide substantial resistance to the flow of liquid through the passage 39.

When the fluid pressure within the passage 39 exceeds the pressure in the gas chamber 37, as when a high amplitude pulse is present, the sleeve 27 will be rapidly shifted upwardly, FIG. 3 depicting the position of the parts in the uppermost limiting position of the sleeve. Immediately following initial upward movements of the sleeve toward the position of FIG. 3, oil which previously filled the interior of the sleeve and conduit 39 will be permitted to flow into the oil chamber 38 through the apertures 35, following the flow paths illustratively represented by the arrows 40.

At its uppermost limiting position, the closed upper end 32 of the sleeve will butt against the top plate 18, the device preferably including a resilient buffer (not shown) between the top plate and the upper end of the sleeve to preclude metal-to-metal contact.

It will further be observed that the size of the flow passage between the conduit block 12 and the oil chamber 38 increases progressively as the sleeve moves upwardly, such progressive increase resulting from a progressively greater amount or extent of the apertures 35 spanning the space between the conduit and the outermost extremity of the oil port.

When the pressure drops within the conduit 39 to a point at which gas pressure exceeds the pressure in the conduit, the bladder will expand to the condition illustrated in FIG. 2, whereat the sleeve will again be disposed at its lower limiting position.

From the foregoing description it will be recognized that there is provided a pulsation dampener device which assures guided movements of the bladder, eliminating the possibility that portions of the bladder will be squeezed between the valve seat and the oil port. Unlike poppet assemblies heretofore known, the guide function provided by the sleeve does not employ springs which add to the inertia necessary to open a flow path between the conduit and the interior of the pressure vessel. The low inertia factor renders the device more readily responsive to rapidly changing pulsing conditions.

Similarly, it will be recognized that a large and progressively increasing flow path is afforded as the sleeve is shifted upwardly into the interior of the pressure vessel, in contrast to poppet assemblies heretofore known wherein constricted flow paths are defined between the conduit and the pressure vessel. The flow constrictions of such systems result in high flow impedance and turbulence effects, with consequent restricted flow in the main conduit as well as in the path across the oil port.

The sleeve assembly as described is durable and inexpensive to manufacture, and is particularly adapted to the dampening of high frequency pulsations due to the rapidity with which the same may be unseated and a large flow path provided.

It will be further understood that an efficient seal between the conduit and the oil port is provided by the thickened rim portion of the bladder where the same attaches to the sleeve, such thickened portion being clampingly engaged about the oil port due, in part, to the connection of the peripheral bead and the annular support shoulder on the sleeve which extends behind the bead.

It will be readily recognized by those skilled in the art that structural variations may be made in the disclosed embodiment without departing from the spirit of the invention. Accordingly, the invention is to be broadly constructed within the scope of the appended claims.

Having thus described the invention and illustrated its use, what is claimed as new and is desired to be secured by Letters Patent is:

1. A pulsation dampener device comprising, in combination, a pressure vessel including an axially directed cylindrical oil port at one end and a top abutment member at the other end in spaced relation to said oil port, said abutment member including a gas charging valve, a liquid flow conduit member fixed to said vessel below said oil port, said conduit member including an orifice adjacent said oil port, said orifice and oil port being in registry and defining an axially elongated vertical bearing surface, a cylindrical actuator sleeve closed at its upper end and slidably guided in said bearing surface for axial movement relative to said vessel between a lower limiting position wherein a shank portion adjacent the lower end of said sleeve projects into said conduit, and an upper limiting position whereat said upper end of said sleeve is disposed adjacent said abutment member and parts of said shank portion are disposed within said vessel, a plurality of apertures formed in said shank portion of said sleeve, said apertures, in said lower limiting position being below the level of said oil port, and a resilient, elastomeric bladder member mounted in said pressure vessel and dividing the same into two chambers, said bladder member including an upper portion surrounding said gas charging valve, and a lower portion secured to said sleeve at a position above the level of said apertures.

2. A dampener device in accordance with claim 1 wherein said apertures are elongated in the direction of the axis of said shank whereby the flow path from said conduit to the interior of said pressure vessel increases progressively as said sleeve moves from said lower toward said upper limiting position.

3. A device in accordance with claim 2 wherein said sleeve includes an annular shoulder and said lower portion of said bladder includes an annular thickened bead portion bonded to said shoulder.

4. A device in accordance with claim 3 wherein said bead portion of said bladder is biased against the walls defining said oil port in said lower limiting position of said sleeve to define a seal at said oil port.

5. A device in accordance with claim 1 wherein said upper limiting position is defined by the engagement of said closed end of said sleeve against said abutment member.

* * * * *